United States Patent
Ohrem

(10) Patent No.: US 6,733,738 B1
(45) Date of Patent: May 11, 2004

(54) METHOD AND DEVICE FOR THE CONTINUOUS PRODUCTION OF NAALCL₄ OR NAFECL₄

(75) Inventor: Hans Leonhard Ohrem, Jugenheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/979,921

(22) PCT Filed: Apr. 25, 2000

(86) PCT No.: PCT/EP00/03686
§ 371 (c)(1),
(2), (4) Date: Feb. 28, 2002

(87) PCT Pub. No.: WO00/73209
PCT Pub. Date: Dec. 7, 2000

(30) Foreign Application Priority Data
May 28, 1999 (DE) .......................... 199 24 495

(51) Int. Cl.⁷ ................................. C01F 7/48
(52) U.S. Cl. ................ 423/463; 423/493; 423/495
(58) Field of Search ................ 423/463, 493, 423/495, DIG. 12, 111, 138

(56) References Cited

U.S. PATENT DOCUMENTS

| | | | |
|---|---|---|---|
| 3,683,590 A | | 8/1972 | Dunn |
| 3,729,543 A | | 4/1973 | Dunn |
| 3,870,511 A | * | 3/1975 | Szekely ................ 75/680 |
| 3,944,647 A | | 3/1976 | Bonsack |
| 4,026,698 A | * | 5/1977 | Koump ................ 75/538 |
| 4,039,647 A | * | 8/1977 | Wohleber et al. ......... 423/495 |
| 4,076,794 A | | 2/1978 | Smith |
| 5,298,233 A | * | 3/1994 | Nagel ................ 423/580.1 |

FOREIGN PATENT DOCUMENTS

EP 0 008 413 A 3/1980

\* cited by examiner

*Primary Examiner*—Ngoc-Yen Nguyen
(74) *Attorney, Agent, or Firm*—Millen, White, Zelano & Branigan, P.C.

(57) ABSTRACT

The invention relates to a method and a device for the production of NADCl₄ in which D is aluminium or iron, where, in a first reaction step, a melt of aluminium or iron is reacted with chlorine gas to give gaseous metal halide, and this is subsequently reacted, in a second reaction step, with solid sodium chloride to give the corresponding compound and is separated off as a melt.

12 Claims, 1 Drawing Sheet

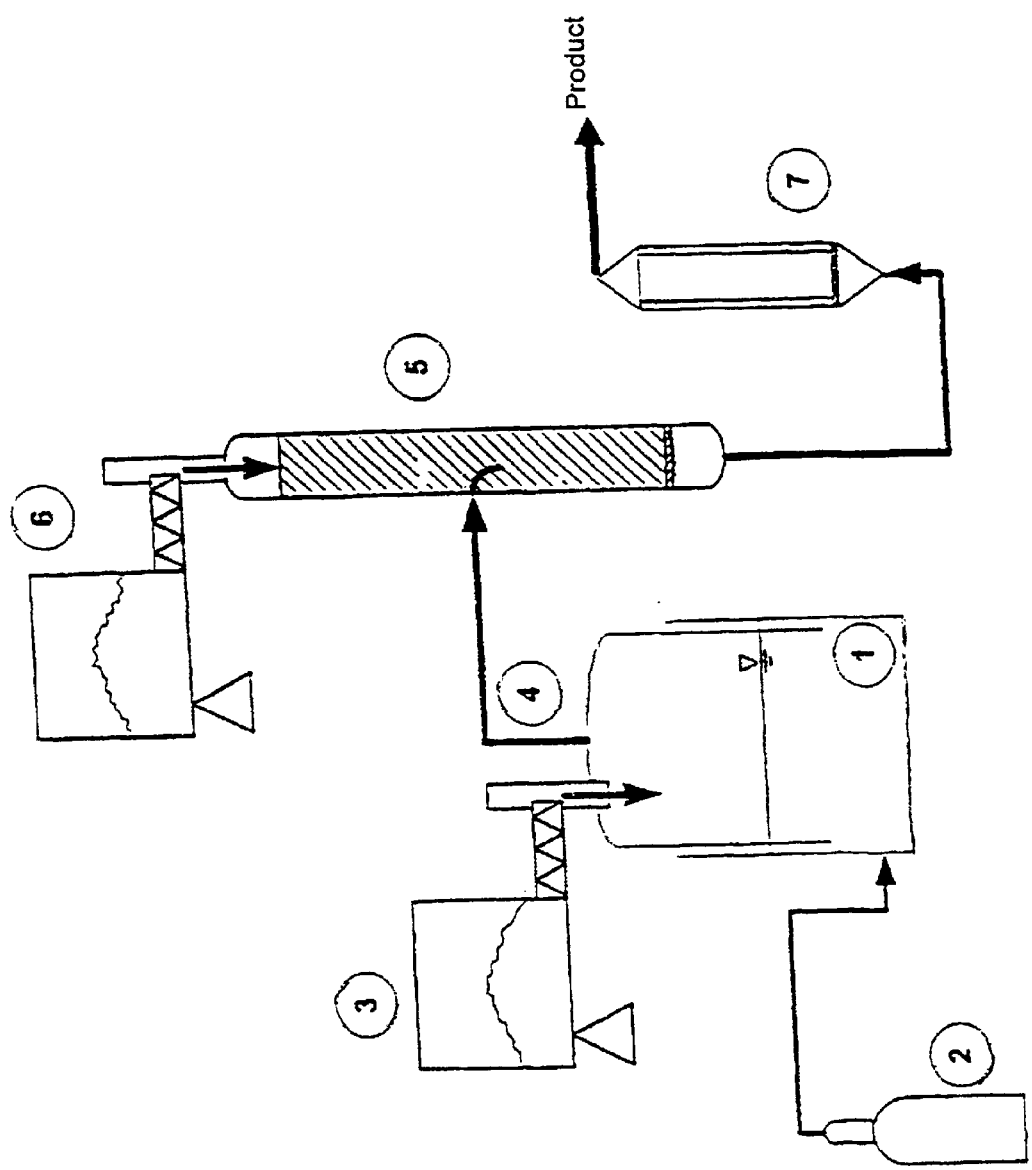

METHOD AND DEVICE FOR THE CONTINUOUS PRODUCTION OF NAALCL₄ OR NAFECL₄

The invention relates to a method and a device for the production of NaDCl$_4$, in which D is aluminium or iron, where, in a first reaction step, a melt of aluminium or iron is reacted with chlorine gas to give gaseous metal halide, and this is subsequently reacted, in a second reaction step, with solid sodium chloride to give the corresponding compound and is separated off as a melt Melts of salts, such as, for example, NaAlCl$_4$ have various areas of application. Salt melts can be employed as storage medium in heat storage systems, as heat transfer media, for example in heating baths, for covering and cleaning molten metals, for the electrocoating of high-melting materials or as melt electrolytes in primary batteries, as described in GB 2046506. A further potential application of these salts is in rechargeable sodium batteries. The salts are employed in batteries which have operating temperatures of between 130° C. and 200° C. (Abraham. J. Electrochem. Soc., Vol. 137, 1189–1190, (1990)).

DE 3419279 describes an electrochemical cell in which the cathode matrix is impregnated with a sodium aluminium halide salt melt electrolyte.

A relatively new area of application is the "ZEBRA battery". This high-temperature cell consists of an electrode of liquid sodium, a beta aluminium electrolyte and an electrode of transition-metal chloride in an NaAlCl4 melt (Cleaver, J. Electrochem. Soc., Vol. 142, 3409–3413, (1995)).

DE 3718920 describes the production of salt melts by the addition of a pure metal and an alkali metal halide to the melt The reaction cell is operated at above the melting point of the salt melt. The alkali metal halide in the working example is NaCl, the molten alkali metal is sodium, and the separator is beta-aluminium oxide. Owing to the use of pure sodium, special safety precautions, such as working under a protective-gas atmosphere, have to be taken. The reactions must take place in separate cells, since poisoning of the separator by the by-product AlHal$_3$ formed must be prevented.

All the methods known hitherto for the production of salt melts work batchwise. A batch procedure has some severe disadvantages compared with a continuous production method. In the case of a batch change, the apparatus has to be opened. The product may then be contaminated by the oxygen from the ambient air, water and dust The batch change results in down times of the plant and thus in a reduced space-time yield. For an effective discontinuous method, large apparatuses have to be used. The start-up process requires correspondingly more energy and time. It has been found that impurities are entrained into the process, in particular during start-up of plants. FR 2168912 describes a complex purification method for alkali metal aluminium halides. The two-step purification process is composed of an oxygen treatment for degradation of the organic impurities and an aluminium treatment for precipitation of iron and heavy metals. The aluminium treatment must be carried out under a nitrogen or argon atmosphere.

For the production of the alkali metal aluminium halides, the reaction of corresponding aluminium halides and alkali metal halides in a closed tube is described (Friedmann, J. Am. Chem. Soc., 72, 2236–2243, (1950)). A pressure increase to 6–7 atmospheres has been observed in this method, which results in problems (FR 2168912). The apparatuses have to be fitted with the appropriate safety precautions.

The object of the invention is to provide a continuous method for the production of pure salt melts which excludes disadvantageous ambient influences, minimises the energy demand and facilitates an optimum space-time yield.

A further object is to make large quantities of salt melts available in the shortest possible time.

The object according to the invention is achieved by a method for the production of salt melts, and mixtures thereof, of the general formula $$NaDCl_4 \tag{1}$$

in which

D is Al or Fe, which, in a first reaction step (i), a melt of aluminium or iron is reacted with chlorine gas to give gaseous metal halide (DCl$_3$), and this is subsequently, in a second reaction step (ii), reacted with solid sodium chloride to give the corresponding compound of the formula (I) and is separated off as a melt.

The invention furthermore relates to a device for carrying out the method, essentially consisting of a reaction vessel (1) containing the melt of the metal D, with a feed device for chlorine gas (2), a collection device for gaseous metal chloride (4) above the reaction vessel (1), and a further reactor vessel (5) which contains sodium chloride in solid form and is connected to the said collection device.

The products from the method are suitable for use as melt electrolyte in electrochemical cells, as storage medium in heat storage systems, as heat transfer medium, for example in heating baths, for covering and cleaning molten metals, for the electrocoating of high-melting materials or as melt electrolytes in rechargeable sodium batteries and primary batteries.

In the alternative methods, the solids, for example NaCl and AlCl$_3$, are mixed and warmed to the melting point. The amount of heat necessary for this purpose has to be supplied from the outside.

Surprisingly, it has been found that the exothermicity of the reaction of aluminium or iron (D) with Cl$_2$ to give aluminium chloride or iron chloride (DCl$_3$) can be utilised for the further process for the production of NaDCl$_4$.

In the process according to the invention, DCl$_3$ (where D=Al or Fe) is formed at temperatures between 700° C. and 1200° C. In contrast to conventional methods, this DCl$_3$ is fed in gaseous form to an alkali metal salt bed of NaCl.

It has been found that the accompanying heat of the gas (DCl$_3$) is sufficient to warm the alkali metal salt (NaCl) to the melting point of the salt melt NaDCl$_4$ (I).

An essential advantage of the method is the use of cheaper raw materials and the utilisation of the heat of reaction being liberated for controlling the temperature of the method. Method steps, such as the condensation of the metal halide (DCl$_3$), can thereby be saved and the energy demand for carrying out the process reduced.

It has been found that the continuous performance of the method enables interfering environmental influences to be excluded. This enables a constantly high quality of the product to be established after the start-up phase.

All continuously operating reaction vessels which appear suitable to the person skilled in the art can be used for the method. For the reaction with chlorine gas, a feed device with gas inlet is necessary. The reaction vessel is provided with a refractory lining. A ceramic lining which is insensitive to the materials employed and the high temperatures is advisable.

The metal D in powder or granule form is provided for the process via a solids metering unit (3).

For collecting the reaction product ($DCl_3$), a collection device (4), provided with a feed line to the downstream reaction vessel (5), is installed above the reaction vessel (1) for the melt The feed of the reaction product takes place between the upper quarter and the lower quarter of the reactor vessel (5), which contains a mixture of metal D and sodium chloride in solid form. Complete conversion of the reactants into the reaction products can thus be ensured.

The salt melt formed runs off in a downward direction through the alkali metal salt bed (NaCl), which is supported by a support grille or a coarse filter plate.

A mixture of solid sodium chloride and metal D in powder or granule form is fed continuously, corresponding to the amount of end product formed and separated off, to the reaction vessel (5) via a solids metering unit (6).

Due to water entrained by the raw materials, undesired HCl gas forms. This can react away to give the metal halide ($DCl_3$) due to amounts of the corresponding metal granules or powder (D) present in the alkali metal salt bed.

It is advisable for a further reactor vessel (7) with alkali metal salt bed to be installed downstream of the reactor vessel (5) in the flow direction for purification of the melt in order to allow the metal halide ($DCl_3$) formed in turn to react away to give $NaDCl_4$.

A temperature control device is merely necessary for heating up once in the start phase and, where appropriate, for cooling. The energy necessary for melting the metal granules (D) is also provided by the heat of reaction.

The method can be carried out continuously or discontinuously as required.

A general example of the invention, which is shown in the drawing, is explained in greater detail below. FIG. 1 shows a reaction vessel containing metal melt 1 having a feed device for chlorine gas 2 and solids metering device 3, collection device for gaseous metal chloride $DCl_3$ 4 and reactor vessel 5 containing metal granule or metal powder and alkali metal salt bed, and solids metering device 6, as well as a downstream reactor vessel 7.

Reaction Step i:

For the production of salts conforming to the formula (1) and mixtures thereof, the raw materials can be fed to the reaction vessel (1) in premixed form via the solids metering device (3). The filling can be carried out under inert gas.

The heatable reaction vessel (1) contains liquid metal melt. Suitable metals (D) are iron and aluminium. Chlorine gas is fed into the reaction apparatus via the feed device (2). The volume of the melt and the volume flow of the gas is determined as a function of the requisite residence time and the desired throughput. A temperature above the melting point of the metal (D) is set in the reaction vessel (1).

The gaseous metal halide ($DCl_3$) is fed to the reaction vessel (5) via the collection device (4) for the reaction product formed.

Reaction Step ii:

The metal halide is fed to the metal granule or metal powder and alkali metal salt bed between the upper and lower quarter of the reactor vessel (5), preferably between the upper quarter and the centre. A mixture of metal granules or powder (D) and alkali metal salt (NaCl) is fed constantly to the reactor vessel via a solids metering device (6) in accordance with consumption.

The metal halide ($DCl_3$) is reacted with the alkali metal salt in the reactor vessel (5) to give $NaDCl_4$.

Reaction Step iii:

The melt maybe contaminated due to contact with water or atmospheric moisture. The hydrogen halide formed can react away with the metal granules (D) added to the salt bed in the reactor vessel (5) to give the metal halide ($DCl_3$).

Reaction Step iv:

For further processing, the metal halide is passed through the reactor vessel (7). Row takes place from bottom to top through the purification unit charged with alkali metal salt NaCl. In the process, the metal halide $DCl_3$ is reacted with the alkali metal salt NaCl to give the desired salt $NaDCl_4$.

The flow from bottom to top through the reactor vessel (7) is not absolutely necessary. However, it has the advantage that the particles becoming smaller due to the reaction are not forced onto the sieve plate by the flow, blocking it. Nevertheless, homogeneous through-flow (plug flow) in the column is ensured in this way. Homogeneous through-flow is an essential prerequisite for complete reaction in the purification unit.

The example given below is given for better illustration of the present invention, but it is not suitable for restricting the invention to the features disclosed herein.

EXAMPLES

Example 1

Production of $NaAlCl_4$

For the production of 1 kg/h of $NaAlCl_4$, 453.7 g/h of $Cl_2$ gas are fed from a stock vessel to a reaction vessel containing initially introduced aluminium melt At the same time, 172.5 g/h of aluminium granules are fed to the reaction vessel via a solids metering device. The $AlCl_3$ forming escapes from the reaction vessel in gas form and is fed via a collection device to a reactor vessel which contains a bed of granular common salt and aluminium. This reaction vessel is supplied with 373.8 g/h of NaCl by a further solids metering device. A certain amount of granular aluminium may be mixed in with this salt if required for reaction with HCl.

The low-viscosity aluminate formed flows downward out of the reaction vessel and is then advantageously passed through a reactor vessel which contains a bed of pure common salt Residues of $AlCl_3$ react therein, likewise to give the desired product.

I claim:

1. Method for the production of salt melts, and mixtures hereof, of the general formula $$NaDCl_4 \qquad (I)$$

in which

D is Al or Fe, characterized in that, in a first reaction step (i), a melt of aluminium or iron is reacted with chlorine gas to give gaseous metal halide ($DCl_3$), and this is subsequently, in a second reaction step (ii), reacted with solid sodium chloride to give the corresponding compound of the formula (I) and is separated off as a melt.

2. Method according to claim 1, characterized in that the reaction in the second reaction step (ii) is carried out with a mixture of sodium chloride and solid metal granules or powder (D), where the metal (D) is reacted, in a further reaction step (iii), in the melt with any HCl formed to give the corresponding metal chloride ($DCl_3$).

3. Method according to claim 2, characterised in that the chloride formed as by-product in reaction step (iii) is converted into the compound of the formula (I) by reaction with solid alkali metal chloride in a downstream reaction step (iv) and separated off as a melt together with the majority of the compound of the formula (I) formed after reaction step (ii).

4. Method according to claim 1, characterized in that the energy being liberated during the reaction of the metal chlorine gas is utilized for the subsequent reaction with NaCl to give the product.

5. Method according to claim 1, characterized in that the reaction is carried out continuously.

6. Method according to claim 5, characterised in that the relevant metal D and the said mixture of metal D and sodium chloride is in each case added in solid form continuously corresponding to the amount of end product formed and separated off.

7. Device for carrying out the method according to claim 1, essentially consisting of a reaction vessel (1) containing the melt of the metal D, having a feed device for chlorine gas (2), a collection device for gaseous metal chloride (4) above the reaction vessel (1), and a further reactor vessel (5), which contains sodium chloride in solid form and is connected to the said collection device.

8. Device according to claim 7, characterised in that a solids metering unit (3) is provided which contains the metal D in powder or granule form and is connected to the radon vessel (1).

9. Device according to claim 7, characterized in that the gas feed to the reactor vessel (5) takes place between the upper quarter and center of the reactor vessel.

10. Device according to claim 7, characterized in that a solids metering unit (6) is provided which contains a mixture of solid sodium chloride and metal D in power or granule form and is connected to the reactor vessel (5).

11. Device according to claim 7, characterized in that a further reactor vessel (7), which contains solid sodium chloride, is installed downstream of the reactor vessel (5).

12. Use of the device according to claim 7 for the production of salt melts of the formula (I) for electrochemical cells, batteries, storage media in heat storage systems, for covering and cleaning molten metals and for the electrocoating of materials.

* * * * *

UNITED STATES PATENT AND TRADEMARK OFFICE
CERTIFICATE OF CORRECTION

PATENT NO. : 6,733,738 B1
DATED : May 11, 2004
INVENTOR(S) : Hans Leonhard Ohrem et al.

It is certified that error appears in the above-identified patent and that said Letters Patent is hereby corrected as shown below:

Column 4,
Line 44, reads "hereof" should read -- thereof --
Line 65, replace "alkali metal" with -- sodium --

Column 5,
Line 2, replace "metal" with -- melt of aluminum or iron --
Line 4, replace "NaCl" with -- sodium chloride --

Columns 5 and 6,
Delete claims 6-12, and replace with the following new claims:

6. Method according to Claim 1, characterised in that, in second reaction step (ii), solid aluminum or iron metal granules or powder are provided mixed with the solid sodium chloride
7. Method according to Claim 6, characterised in that the reaction is carried out continuously.
8. Method according to Claim 7, characterised in that the melt of aluminum or iron and the mixture of solid aluminum or iron metal granules or powder and solid sodium chloride are added continuously corresponding to the amount of end product formed and separated off.
9. Method according to Claim 2, characterised in that the reaction is carried out continuously.
10. Method according to Claim 4, characterised in that the reaction is carried out continuously.
11. Method according to Claim 2, characterized in that the energy being liberated during the reaction of the melt of aluminium or iron with chlorine gas is utilized for the subsequent reaction with sodium chloride to give the product.
12. Method according to Claim 3, characterized in that the energy being liberated during the reaction of the melt of aluminium or iron with chlorine gas is utilized for the subsequent reaction with sodium chloride to give the product. --

Signed and Sealed this

Fourteenth Day of December, 2004

JON W. DUDAS
*Director of the United States Patent and Trademark Office*